Nov. 24, 1964  B. F. SUMMEROUR  3,158,137
AUTOMATIC CHICKEN FEEDER AND MANURE REMOVER
Filed Jan. 19, 1962  6 Sheets-Sheet 1

Benjamin F. Summerour
INVENTOR.

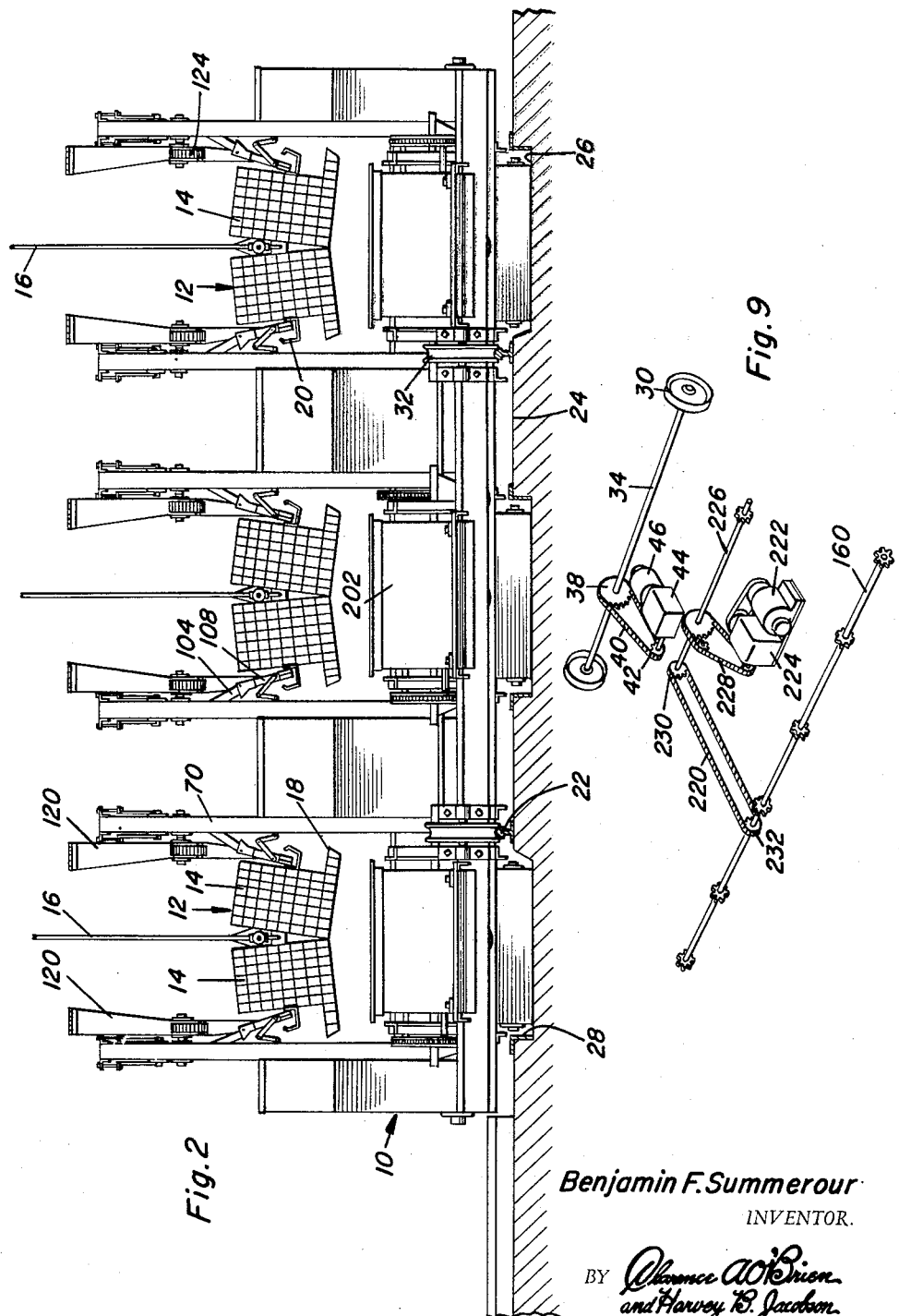

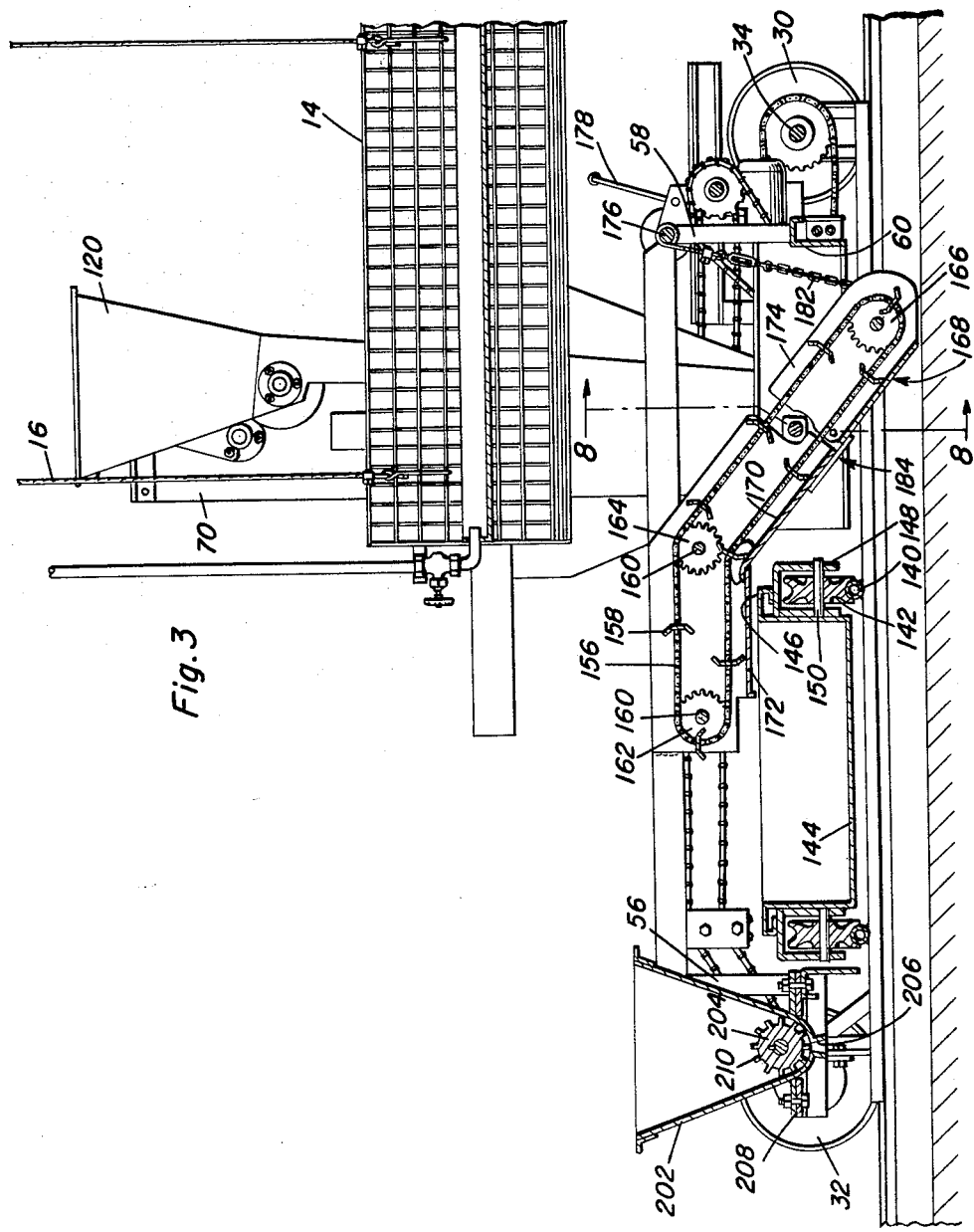

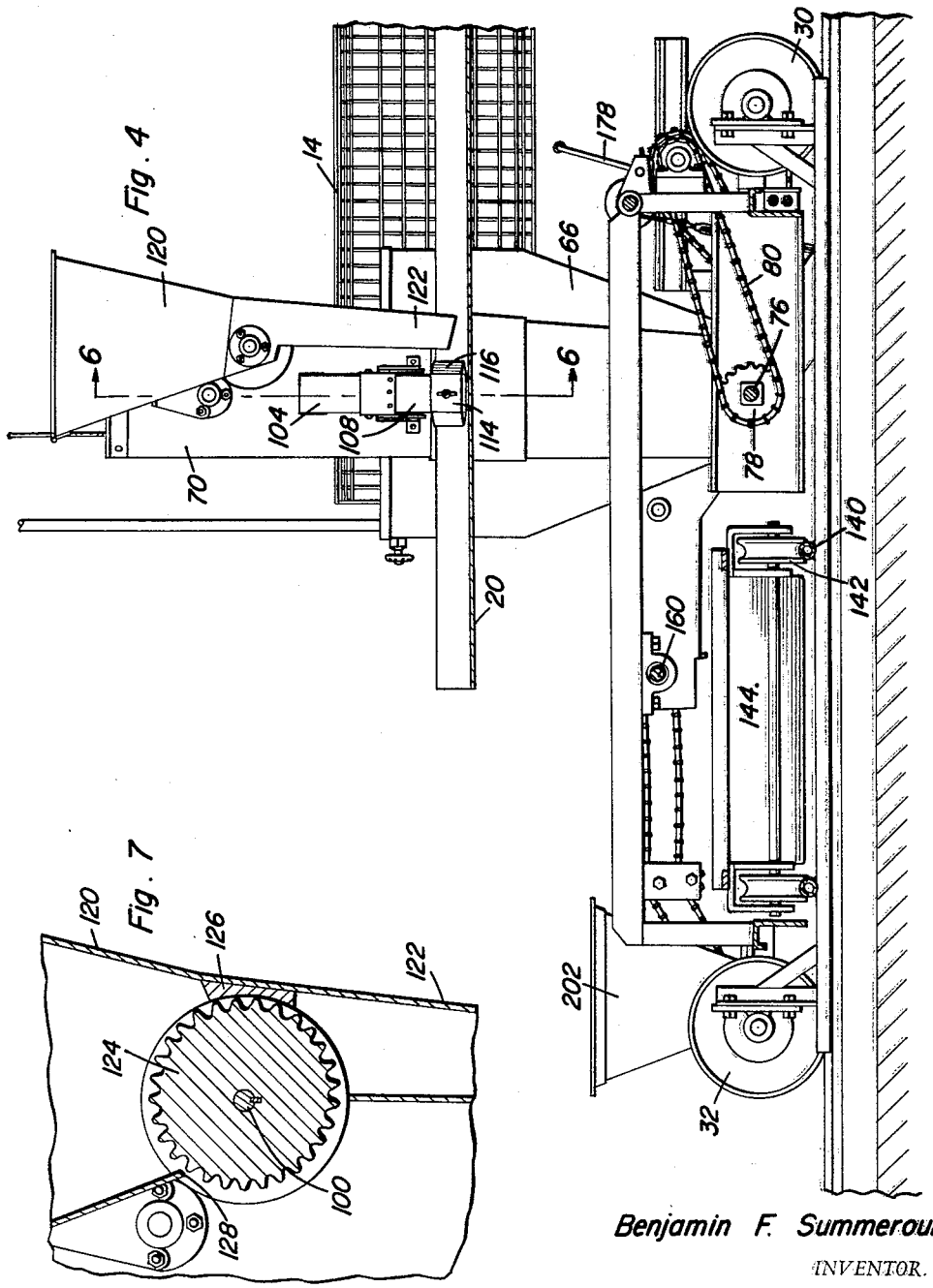

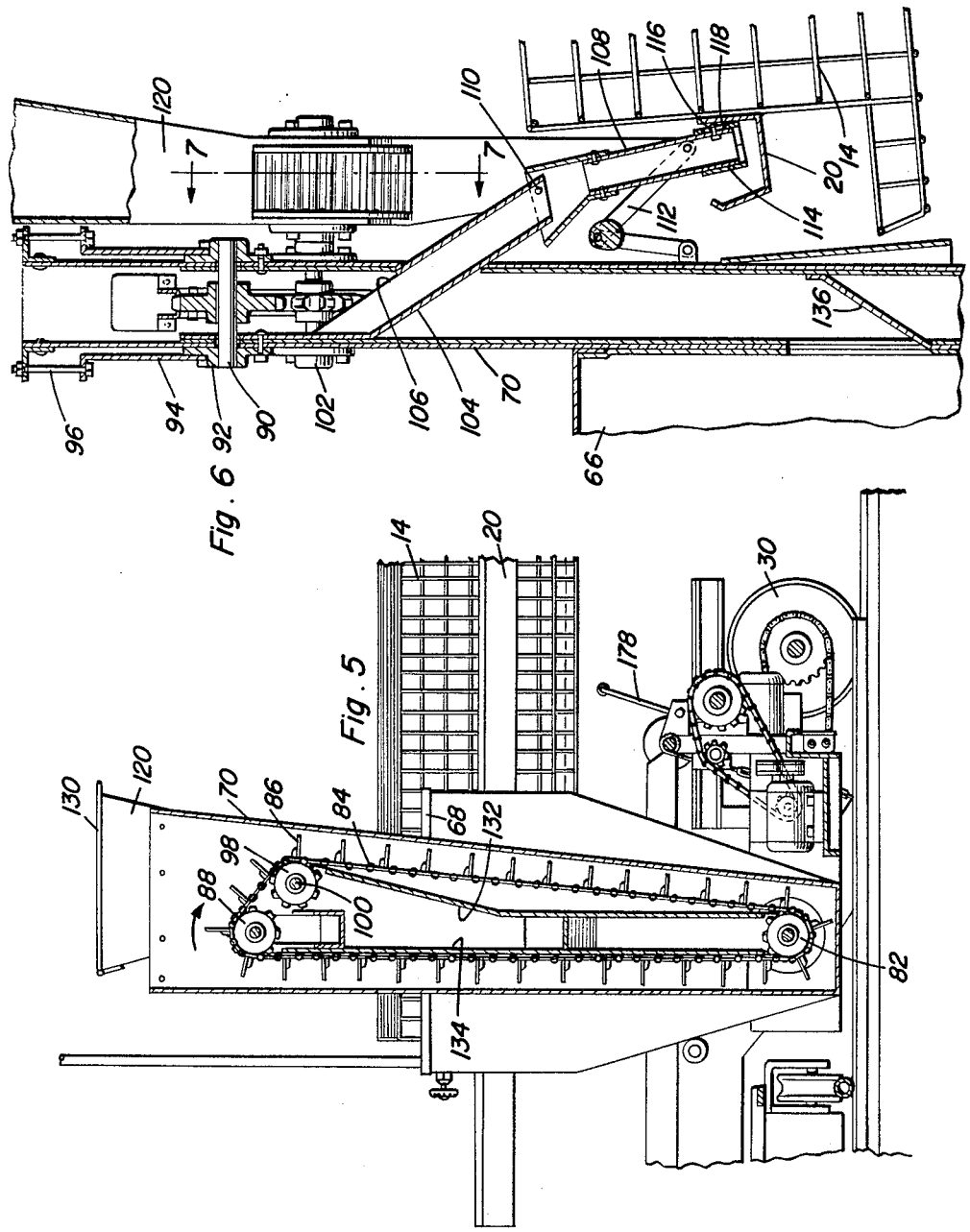

Benjamin F. Summerour
INVENTOR.

3,158,137
AUTOMATIC CHICKEN FEEDER AND
MANURE REMOVER
Benjamin F. Summerour, 237 N. Peachtree St.,
Norcross, Ga.
Filed Jan. 19, 1962, Ser. No. 167,316
7 Claims. (Cl. 119—22)

The present invention generally relates to a novel machine for automatically discharging chicken feed into a continuous trough alongside of a line or lines of chicken cages so that the feed will be available to the chickens or hens within the cages, the machine also being useful in removing manure droppings from the floor under the cages.

The present invention is specifically adapted for use with laying hens and is disclosed in combination with a multiple aisle layout of cages such as a two line cage installation, a three line double cage installation or any other suitable line installation. However, the machine is adaptable for use in many other orientations where birds, animals or the like are retained in cages or in alignment whereby feed may be dispensed in a trough and manure removed from under the cages or animals by the same machine.

Basically, the present invention incorporates a trackway extending longitudinally throughout the length of the building or hen house with a carriage supported thereon, the carriage including means for propelling itself along the trackway and elevating feed from a source hopper for discharge continuously along an elevated feed trough. The carriage also includes a pickup conveyor assembly for manure droppings together with a receptacle or pan receiving such droppings, the receptacle or pen being mounted on a transverse trackway for lateral discharge thereof when the carriage reaches a predetermined position in the hen house. The carriage also includes means associated with the feed dispenser for dispensing grit or oyster shells and also, there is provided means for spreading lime, superphosphate or the like on the dropping manure beds under the cages.

With the foregoing in mind, it is the primary object of the present invention to provide a machine for accomplishing the purposes intended which may be automatically controlled with a timer mechanism whereby the feeding operation may be initiated at predetermined time intervals without the necessity of an operator being present for controlling the device.

Another object of the present invention is to provide a device in accordance with the preceding object including means for rendering the pickup conveyor for the manure operative as desired inasmuch as the manure removing operation may not be necessary each time the feeding operation is completed.

Another important feature of the present invention is to provide a machine in accordance with the preceding objects having a novel discharge chute for the feed elevator which enables the material to be discharged into the feed troughs attached to the cages even though the feed troughs may vary slightly from a straight line condition inasmuch as the discharge chute may move laterally in relation to its path of movement, the chute having a guide shoe thereon for guiding the chute in relation to the feed trough in either direction of movement of the chute in relation to the feed trough.

With all of the foregoing objects in mind, it is yet another important object of the present invention to provide a machine for automatically feeding chickens or laying hens and removing manure droppings from under the cages which is simple in construction, easy to install, efficient in operation, foolproof, longlasting and durable, time and labor saving and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the machine of the present invention illustrating rather schematically the orientation thereof in relation to three lines of double cages disposed in a hen house or the like;

FIGURE 2 is an end elevational view, on an enlarged scale, of the assembly of FIGURE 1 illustrating the orientation of the feed elevator and dispensers to the feed troughs and the orientation of the manure pickup conveyors in relation to the cages;

FIGURE 3 is a detailed longitudinal sectional view, on an enlarged scale, taken substantially upon a plane passing along section line 3—3 of FIGURE 1 illustrating the structure of the present invention;

FIGURE 4 is a detailed sectional view, on an enlarged scale, taken substantially upon a plane passing along section line 4—4 of FIGURE 1 illustrating further structural details of the machine;

FIGURE 5 is a detailed sectional view, on an enlarged scale, taken substantially upon a plane passing along section line 5—5 of FIGURE 1 illustrating the construction of the feed elevator;

FIGURE 6 is a vertical sectional view, on an enlarged scale, taken substantially upon a plane passing along section line 6—6 of FIGURE 4 illustrating the construction of the feeding and dispensing device;

FIGURE 7 is a detailed sectional view, on an enlarged scale, taken substantially upon a plane passing along section line 7—7 of FIGURE 6 illustrating the dispenser for grit, oyster shells or the like;

Figure 1:
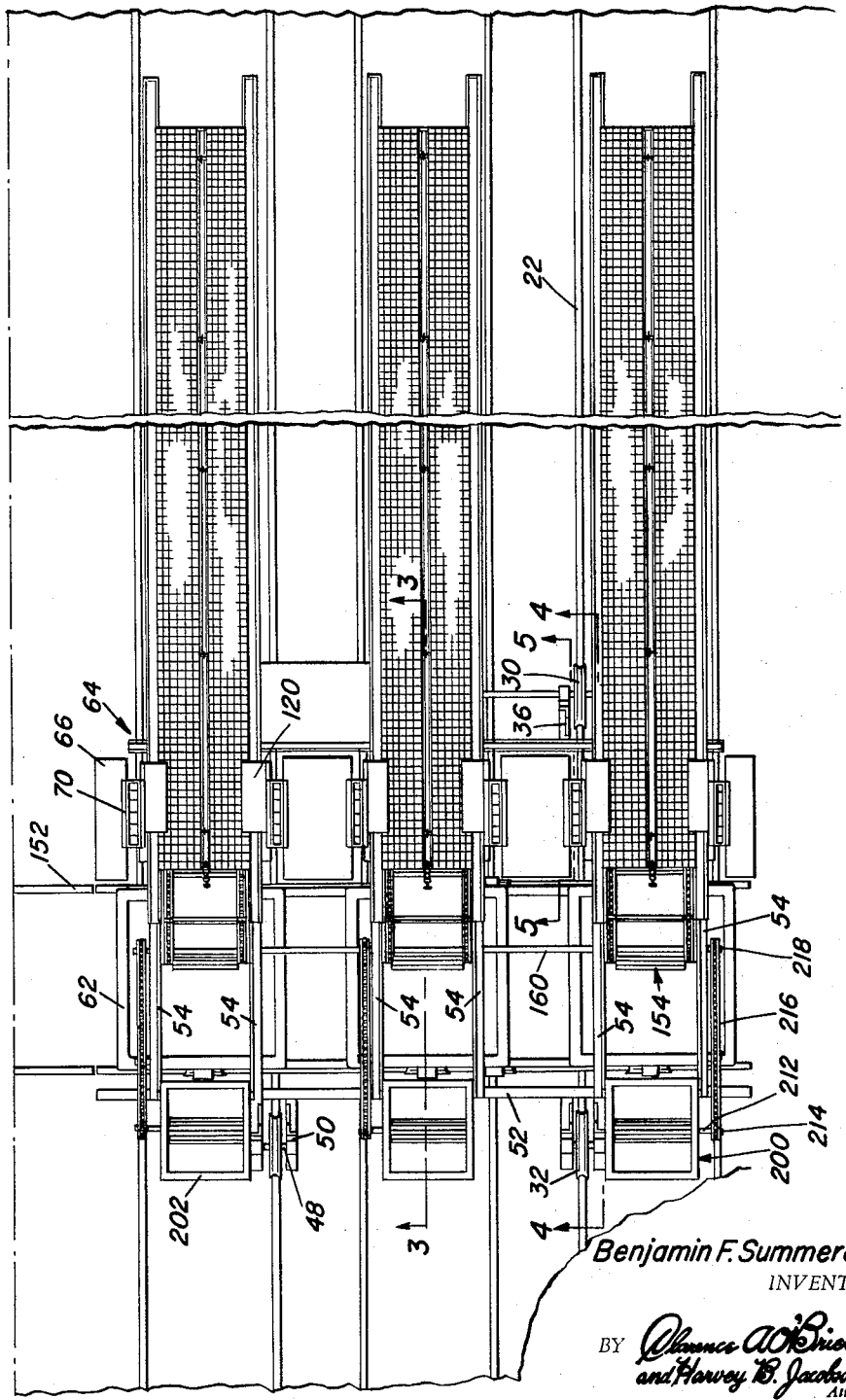
Figure 8:
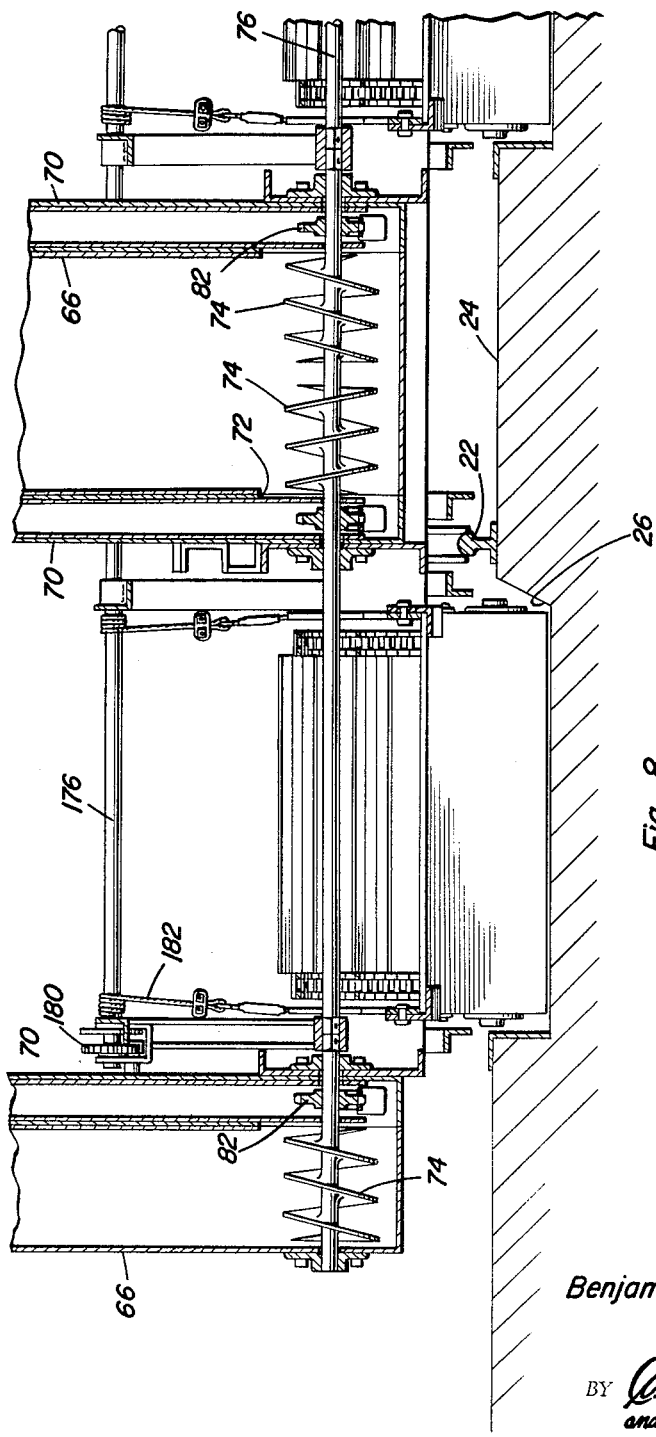

FIGURE 8 is a detailed sectional view, on an enlarged scale, taken substantially upon a plane passing along section line 8—8 of FIGURE 3 illustrating the particular construction of the conveyor for assuring the supply of feed to the elevators and also illustrating other structural details of the device; and FIGURE 9 is a schematic perspective view, on a reduced scale, illustrating the drive arrangement for the propelling wheels and also for the pickup conveyor.

Referring now specifically to the drawings, the numeral 10 generally designates the automatic chicken or laying hen feeder and manure remover which is illustrated in combination with three lines of double cages with each line generally being designated by the numeral 12 and including two rows or lines of cages 14 which are simply supported by any suitable suspending rod or cable 16 which may be attached to the roof or other overhead support in the hen house. Each cage 14 is provided with a laterally and downwardly inclined egg receiving trough 18 at the lower edge thereof and a feed trough 20 elevated above the egg receiving trough 18 so that laying hens disposed within the cages 14 will have access to the feeding trough 20 in a conventional manner. The cages 14 are of conventional construction and are orientated in a conventional manner. The eggs are gathered from the egg receiving trough 18 in any suitable manner and normally, manual labor is employed to discharge feed from receptacles such as buckets into the feed trough 20 and the present invention eliminates such manual labor and automatically discharges feed into the feed troughs 20 at predetermined intervals or under the manual control of an operator.

The machine 10 of the present invention is mounted on a longitudinal trackway defined by a pair of longitudinal rails 22 mounted just interiorly of the two outer lines of cages. The rails 22 are orientated in such a manner that they do not interfere with the normal egg gathering operation and do not project into the aisles between the lines of cages in any appreciable degree. The rails 22 are supported in any suitable manner upon a floor surface 24 which may be a dirt floor or any other suitable floor structure. The floor 24 may be of concrete, wood or the like or may be dirt in which event the rails 22 would be supported on suitable base members provided therefor. The area underlying each line of cages 12 is a manure dropping area and may be smooth or provided with recessed areas forming troughs 26 which are defined by side members 28 or the like.

The rails 22 extend throughout the length of the building or substantially so with there usually being provided some space at one end of the hen house to provide access laterally of the cages and also provide access to the length of the machine for servicing the machine as desired. If there are a number of individual houses, one end wall of the hen house may be provided with openable doors and the rails 2 extended to the entrance end of an adjacent house thereby enabling the machine to be moved from one hen house to another. Also, if it is desired to move the machine for relatively long distances, extensions of the rails 22 may be provided on the bed of a truck or the like which may be driven into a depressed area adjacent the end of the building or the end of the building may be at an elevated point in relation to the ground surface whereby the extension of the rails on the flat bed of a truck may be aligned with the rails 22 so that the machine may be propelled directly onto the truck for transport to another hen house for discharge onto rails in that hen house thus enabling a single machine to be used with any desired number of separate hen houses.

The machine 10 includes an open framework supported by two driving wheels 30 and two idling wheels 32 which are disposed at opposite ends of the framework. The driving wheels 30 are mounted on an elongated shaft 34 journaled in forwardly projecting bearing brackets 36 and provided with an enlarged sprocket gear 38 thereon. The sprocket gear 38 is engaged by a sprocket chain 40 that is entrained over a drive sprocket gear 42 driven from the gear reduction box 44 powered by an electric motor 46 whereby energization of the electric motor 46 will cause the shaft 34 to rotate and the driving wheels 30 to rotate to propel the machine. The motor 46 is of the reversible type whereby the machine may be propelled in either direction on the rails 22. Any suitable mechanism may be provided for supplying electrical energy to the movable motor 46 such as conductor means in the form of flexible conductors supported from overhead or the like and having sufficient length to enable the motor to move with the machine. A suitable timing mechanism may be provided for automatically operating the motor in both directions of movement so that the machine will move down from one end of the building to the other upon an initial energization of the motor after which the energy supply may be interrupted by a suitable limit switch or the like. After a predetermined time, the motor will be energized in an opposite direction thus propelling the machine back to the original end of the building where a similar limit switch will stop the motor thus stopping the machine.

The supporting or idling wheels 32 are carried by short shafts 48 journaled in rearwardly extending bearing brackets 50 carried by a transverse frame member 52. Longitudinal frame members 54 extend from the transverse frame member 52 and are elevated thereabove by upstanding brackets 56 at the rear end thereof and similar brackets 58 at the forward end thereof which extend downwardly and are connected to the forward transverse frame member 60. Supported from the elevated brackets 58 is a plurality of generally rectangular framing assemblies 62 and supported forwardly thereof is a plurality of chicken feed elevators generally designated by the numeral 64 with each elevator assembly including a hopper 66. The hopper 66 disposed between the double lines of cages are double hoppers while the hoppers disposed exteriorly are single hoppers and each hopper 66 is provided with a removable lid 68 by which feed may be poured into the hopper. Extending upwardly alongside each hopper 66 is an elongated casing or housing 70 of rectangular cross-sectional configuration with the bottom of the casing or housing being communicated with the bottom of the hopper 66 respectively by virtue of an opening 72. Disposed in the bottom of each hopper 66 is a screw auger 74 with there being a single flight auger in the single hopper 66 and a double flight auger in the double hoppers 66 so that chicken feed is moved into each of the housings 70 through the openings 72. The flights 74 are mounted on a single shaft 76 driven by a sprocket gear 78 engaging a sprocket chain 80.

Disposed in each housing 70 is a sprocket gear 82 mounted on the shaft 76. As illustrated in FIGURE 5, the sprocket gear 82 has an endless conveying chain 84 entrained thereover and the chain 84 has a plurality of generally rectangular plate-type flights 86 thereon which are closely received within the confines of the housing 70. That is, the flights 86 have a width substantially the same thickness as the housing 70 and the free ends thereof are disclosed in closely spaced relation to the side walls thereof. When the chain 84 goes around the sprocket gear 82, the flights will be disposed slightly above the bottom of the housing 70 thus serving to convey the feed upwardly in the housing 70. Inasmuch as the size of the entrance opening is such that the lower portion of the housing 70 is always filled with feed, the flights 86 will pickup substantially an equal amount of feed at all times thus discharging an equal amount of feed in each increment of the feed trough.

The upper end of the chain 84 is entrained over an upper sprocket gear 88 mounted on a short shaft 90 carried by bearing blocks 92 mounted on the housing 70 for limited sliding movement whereby the bearing blocks 92 may be moved by virtue of straps 94 connected to connecting bolts 96 thus enabling adjustment in the slack in the chain. This construction is illustrated particularly in FIGURE 6 and a second upper sprocket gear 98 is provided adjacent the sprocket gear 88 and also receives the chain 84. The sprocket gear 98 is mounted on a shaft 100 journaled in bearings 102 and the three sprocket gears 82, 88 and 98 form a support for the conveyor chain 84.

Disposed immediately below the sprocket gear 88, the housing is provided with a laterally and downwardly inclined chute 104 which receives feed as it is discharged downwardly from the flights 86 as they pass over the sprocket chain 88. The chute is provided with an open top 106 which faces upwardly and the bottom thereof extends downwardly and laterally outwardly of the housing in an inclined manner. A pivotal chute extension 108 is attached to the discharge end of the chute 104 by virtue of a pivot pin 110 whereby the chute extension 108 may swing laterally in relation to the housing 70 thus enabling the discharge end thereof to be disposed properly in the feed trough 20. A pivotal brace member 112 in the form of a pair of articulated members is disposed between the housing 70 and the lower end portion of the chute extension 108 thus stabilizing the chute extension and maintaining it in position insofar as the fore and aft attitude thereof is concerned. Longitudinally adjustably mounted on the lower end of the chute extension 108 is a shoe 114 with each end thereof tapered as indicated by numeral 116. This provides a guide for engaging the trough 20 for centering the chute extension 108 in place. Also, the adjustment of the shoe 114 is accomplished by a fastener 116 extending through a slot 118 in the shoe 114. The vertical spacing of the shoe 114 above the bottom of the feed trough 20 will gauge the quantity of feed discharged from the chute extension 108 inasmuch as this distance will determine the depth of feed discharged into the trough 20.

Mounted alongside of the housing 70 is a small hopper 120 having a discharge chute 122 immediately adjacent the chute extension 108. Disposed interiorly of the hopper 120 is a metering wheel 124 having the periphery thereof disposed adjacent an arcuate block 126 for metering grit or oyster shells downwardly into the chute 122 for discharge into the feed trough 20. A portion of the periphery of the metering wheel 120 projects outwardly of an opening 128 in the hopper 120 to enable self-cleaning of the metering wheel 124. Also, the metering wheel 124 is mounted on the shaft 100 which extends beyond the confines of the housing and bearing block on one side of the housing 70. The hopper 120 may be provided with a pivotal cover or lid 130 or may be open as desired and the hopper is supported from the housing 70 in any suitable manner whereby this additional hopper and dispenser may be removed if not required.

As illustrated in FIGURE 5, the housing 70 is provided with a transverse partition 132 which has a terminal upper edge adjacent the inner surface of the conveying chain 84 immediately below the sprocket wheel 98. The lower end of the partition 132 extends adjacent the sprocket wheel 82. Spaced from the partition 132 is a similar partition 134 which has the upper end thereof terminating immediately below and generally tangential to the sprocket gear 88 and the lower end thereof terminating adjacent to and tangential to the sprocket gear 82 thus defining a return guide for the surplus chicken feed which constantly overflows the discharge chute 104. Below the top edge of the hopper 86, there is provided an inclined partition member 136 which extends from the hopper wall upwardly and across the space between partitions 132 and 134 as illustrated in FIGURE 6 whereby any feed passing downwardly between the partitions 132 and 134 will be discharged back into the hopper 66 so that it may be reused. With this assembly, there is actually formed, by the upward moving chain 84 in the side of housing 70, a continuous full stream of feed from sprocket gear 82, moving vertically upward to sprocket gear 88, thence vertically downward into delivery chute 104, thereby effectively conveying the feed to the feed trough 20. The location of the upper end of partition 132 is very close in clearance to the chain 84 at the point where it leaves sprocket gear 98, and thus there is no falling feed to foul flights 86 as they pass under sprocket gear 82.

The hoppers 66 and housings 70 as well as the hopper 120 all may be constructed conveniently of a suitable gauge sheet metal having the components thereof secured together in any suitable manner such as by seaming, soldering, riveting or the like and the size relationship thereof may vary depending upon sound engineering practices. Also, the slow speed characteristics of the mechanism eliminate the necessity of providing lubrication in any excessive amounts such as would possibly contaminate the feed thereby eliminating this problem.

Mounted rearwardly of the hoppers 66 is a pair of transverse tracks or rails 140 which rollingly support a plurality of grooved supporting wheels 142. The grooved supporting wheels are arranged in pairs with each pair supporting a tray or pan in the form of a receptacle 144. The tray or receptacle 144 has a flange 146 which is supported by an inverted U-shaped bracket 148 that receives the axle 150 of a supporting wheel 142. Thus, the tray or pan 144 is capable of pivotal movement about substantially a longitudinal axis in relation to the movement of the machine and is transversely movable on the rails 140. The pans or trays may be suitably interconnected so that they will all move in unison and this will enable the pans or trays to be pivoted for dumping after they have been moved laterally of the machine onto rails such as rails 152 extending laterally of the henhouse to a desired dumping area. Thus, by stopping the machine in alignment with the rails 152, the trays or pans may be moved laterally onto the rails 152 and dumped into a large receptacle or into any suitable area.

The trays or receptacles are for the purpose of receiving manure droppings which are picked up by a pickup conveyor assembly generally designated by numeral 154. This particular construction is illustrated in FIGURE 3 and includes a pair of parallel sprocket chains 156 having a plurality of bar-like slats 158 extending therebetween along with shafts 160 which mount sprocket gears 162, 164 and 166 thereby supporting the pickup conveyor. The forward portion of the pickup conveyor is designated by numeral 168 and is pivoted about the shafts 160 which supports the sprocket gears 164. A bottom 170 is provided in the forward section 168 and a similar bottom 172 is provided in the horizontal portion of the pickup conveyor. The forward end of the side walls 174 of the forward portion 168 is connected to a lift element having one end thereof connected to a shaft 176 which is rotatable generally in the nature of a winch for raising and lowering the forward end of the forward section by the use of a handle 178 and a ratchet mechanism 180. This enables the flexible chain and cable assembly to be wound thereon thus raising and lowering the forward end of the pickup conveyor assembly. The forward end of the bottom 170 acts somewhat as a scraper along the bottom surface of the dropping area 26 and the downward movement of the bar-like slats around sprocket gear 166 and onto the upper surface of the forward portion of bottom 170 serves to push the manure material upward and backwardly on section 168, 170 and 172 and dump same into the receptacle 144 due to the relationship of the pickup conveyor to the receptacle 144 as seen in FIGURE 3. Adjustment of the pickup conveyor assembly may be effected by the adjustment mechanism generally designated by numeral 184 in FIGURE 3 which may be of any suitable construction.

Mounted rearwardly of the pickup conveyor assemblies 154 is a plurality of spreader assemblies 200 each of which includes a hopper 202 having a dispenser cylinder 204 journaled in the bottom thereof and overlying a transverse discharge spout or slot 206 which discharges superphosphate or lime in the manure dropping area. The hopper 202 is supported on brackets 208. The cylinders 204 have radial vanes 210 thereon and are mounted on shafts 212. One end of each shaft extends outwardly of the hopper and is provided with a sprocket gear 214 engaged by a sprocket chain 216. The sprocket chain 216 is mounted on the transverse shaft 160 which also drives the pickup conveyors and which is driven by a sprocket chain 220 through an electric motor 222, a gear reduction mechanism 224, a shaft 226, a sprocket drive 228 connecting the output of the reduction gear 224 and the shaft 226 together with a sprocket gear 230 engaging the sprocket chain 220 which also engages the sprocket gear 232 on the shaft 160.

The lime or superphosphate spreader spreads such material on the manure dropping bed from which the manure has just been removed. The superphosphate or lime spread on the manure beds will chemically lock the volatile ammonia into the manure thus reducing the odor and increasing the nitrogen content of the manure and likewise its fertilizer value. Fresh manure is an excellent media for the incubation of fly eggs. The lime or phosphate acts as a repellent to the fly and aids in fly control. The manure droppings may be spread in a conventional manner with a spreader by scattering it over the fields or the like but this invention also facilitates the dumping of the droppings into an open shed for a drying period of several weeks. The open shed will have a roof to prevent rain from coming into contact with the manure. When it is dry, it may be processed by pulverizing, screening and being bagged thus providing a readily merchandizable by-product which will find a market since this material is well known and one of the best fertilizers for gardens, lawn and the like.

The particular framework which supports the components on the carriage is variable but sufficiently rigid for purposes of retaining the components in assembled relation. The hopper and elevators for the feed may be of galvanized metal or the like. Two electric motors operate the machine, one of which moves the machine back and forth by use of a regular reversing switch and the second of which operates the feed dispensing or manure removing process and always rotates in the same direction. The electrical energy may be fed to the motors by heavy drop cord paid out over a series of rollers fastened to the wall of the house. A platform for an operator may be provided and one practical installation involves an arrangement in which the machine moves 45 feet per minute with the feed elevators rotating at 11 r.p.m. which is accomplished by speed reduction mechanisms and shafting arrangement. Also, it is pointed out that in certain installations, the feed augers in the hopper may be eliminated whereby the feed will slide on inclined surfaces provided in the hopper. The feeding operation will be carried out at separate times from the manure removing operation and a suitable clutching mechanism may be provided for selectively connecting the manure removing and lime spreading mechanism and the feed dispensing mechanism to the second motor.

Also, the machine of the present invention may be moved laterally at the end of a hen house to be aligned with another hen house by running the carriage out onto a laterally movable supporting dolly or the like carried by transverse tracks.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination of a feed dispenser and manure droppings remover means for use with an elongated line of cages having a continuous feed trough comprising, a movably supported carriage, means for propelling the carriage along the row of cages, feed hopper means mounted on said carriage, conveying means operatively associated with said feed hopper means for conveying feed from the hopper to said trough, said manure droppings remover comprising an endless pick-up conveyor having a plurality of scrapers mounted on said carriage and extending laterally beneath the row of cages for removing manure droppings from the floor surface beneath said cages, receptacle means mounted on said carriage adjacent said endless pick-up conveyor for receiving the manure droppings.

2. The combination as defined in claim 1 wherein said feed conveying means includes a housing extending upwardly from the feed hopper means, a downwardly inclined discharge chute adjacent the upper end of the housing and extending laterally from one side thereof and communicating with the trough whereby chicken feed may be dispensed into the trough, an endless conveyor chain disposed in said housing and having a plurality of flights thereon for picking up feed from the hopper means and conveying it upwardly in the housing for discharge into the troughs through the chutes.

3. The combination as defined in claim 2 wherein said hopper means includes screw auger means, said housing including an opening at the bottom thereof communicating with the hopper means at the discharge of the screw auger means whereby the screw auger means will convey feed from the hopper means into the housing for maintaining the supply of feed therein.

4. The combination as defined in claim 2 wherein said discharge chute is provided with an extension chute extending into the trough, said extension chute having a shoe on the lower end thereof with the shoe having rounded ends for engaging the trough, said shoe being adjustable in relation to the extension chute for varying the space between the shoe and the bottom of the trough for varying the depth of the feed being discharged into the trough.

5. The combination as defined in claim 4 wherein an auxiliary hopper is mounted along side of said hopper means, said auxiliary hopper including a discharge chute communicating with the trough for dispensing grit or the like, said auxiliary hopper including a rotatable dispenser wheel mounted therein for controlling discharge of material therefrom.

6. The combination defined in claim 5 wherein said endless pick-up conveyor includes a plurality of interconnecting slats extending between a pair of parallel side chains, an inclined bottom underlying the parallel chains and forming a support for said slats and forming a surface on which manure droppings may be pushed toward the rear of the pick-up conveyor.

7. The combination as defined in claim 6 wherein said carriage includes a lateral track, said receptacle means including a receptacle having wheels rollingly engaging the lateral track for lateral movement of the receptacle when the receptacle has been filled, said carriage being positionable with the lateral track aligned with a similar track extending to a discharge area for manure droppings whereby the receptacle may be rolled off of the carriage for emptying and then rolled back onto the track on the carriage.

References Cited by the Examiner

UNITED STATES PATENTS

| | | | |
|---|---|---|---|
| 971,158 | 9/10 | Soos | 15—78 |
| 1,178,240 | 4/16 | Koch | 15—84 XR |
| 1,554,376 | 9/25 | Schrag | 15—84 |
| 2,563,321 | 8/51 | Dugan | 119—52 |
| 2,595,392 | 5/52 | Lalancette | 119—22 |
| 2,601,057 | 6/52 | Roberts et al. | 119—52 |

T. GRAHAM CRAVER, *Primary Examiner.*

CARL W. ROBINSON, ARNOLD RUEGG, *Examiners.*